United States Patent
Shum

(12) 
(10) Patent No.: US 7,118,503 B2
(45) Date of Patent: Oct. 10, 2006

(54) CREEP LOCKING RETENTION MECHANISM (CLIP)

(75) Inventor: Andrew C. Shum, Ithaca, NY (US)

(73) Assignee: BorgWarner Inc., Auburn Hills, MI (US)

(*) Notice: Subject to any disclaimer, the term of this patent is extended or adjusted under 35 U.S.C. 154(b) by 192 days.

(21) Appl. No.: 10/729,393

(22) Filed: Dec. 5, 2003

(65) Prior Publication Data
US 2005/0049095 A1    Mar. 3, 2005

Related U.S. Application Data

(60) Provisional application No. 60/498,172, filed on Aug. 27, 2003.

(51) Int. Cl.
*F16H 7/08* (2006.01)
(52) U.S. Cl. .................. 474/111; 474/140
(58) Field of Classification Search ............ 474/101, 474/111, 140
See application file for complete search history.

(56) References Cited

U.S. PATENT DOCUMENTS

| | | | |
|---|---|---|---|
| 5,184,983 A * | 2/1993 | Shimaya et al. | 474/111 |
| 5,813,935 A * | 9/1998 | Dembosky et al. | 474/111 |
| 6,302,816 B1 | 10/2001 | Wigsten | 474/111 |
| 6,612,952 B1 * | 9/2003 | Simpson et al. | 474/111 |

FOREIGN PATENT DOCUMENTS

WO    WO/ 03/062668    7/2003

* cited by examiner

Primary Examiner—Vicky A. Johnson
(74) Attorney, Agent, or Firm—Brown & Michaels, PC; Greg Dziegielewski

(57) ABSTRACT

A device having an allowance for creeping is provided. The device includes: a base member having a receiving element; and an overlaying member, subject to creeping, overlaying on top of the base member, the overlaying member having a region at one end thereof, wherein a tip member is free from restriction or force exerted thereon due to creeping deformation thereof.

13 Claims, 2 Drawing Sheets

CREEP LOCKING RETENTION MECHANISM (CLIP)

REFERENCE TO PROVISIONAL APPLICATION

This application claims an invention which was disclosed in Provisional Application No. 60/498,172, filed Aug. 27, 2003, entitled "Creep Locking Retention Mechanism (Clip) ". The benefit under 35 USC §119(e) of the United States provisional application is hereby claimed, and the aforementioned application is hereby incorporated herein by reference.

FIELD OF THE INVENTION

The invention pertains to the field of assembly of many plastic parts to other parts. More particularly, the invention pertains to a creep locking retention mechanism (clip).

BACKGROUND OF THE INVENTION

Published WIPO patent application, WO03062668A1, entitled SNAP-FIT CHAIN GUIDE teaches a chain guide including a bracket adapted for being secured to an engine. The bracket includes a support surface including a leading end and a trailing end, and further includes a first saw-tooth fixing element. A guide shoe includes: (i) a shoe leading end; (ii) a shoe trailing end spaced from the shoe leading end in a chain movement direction; (iii) a chain guide surface extending between the shoe leading end and the shoe trailing end and adapted for slidably supporting an associated chain moving in the chain movement direction; and, (iv) an inner surface positioned adjacent the support surface of said bracket. The guide shoe further includes a second saw-tooth fixing element that mates with the first saw-tooth fixing element of the bracket to inhibit disconnection of the guide shoe and the bracket.

U.S. Pat. No. 6,302,816 entitled CHAIN GUIDE OR TENSIONER ARM WITH SHEET METAL BRACKET AND ALTERNATING TABS by Wigsten, Mark and assigned to BorgWarner Inc teaches a guide or tensioner arm including a bracket made from a formed sheet metal stamping. The bracket is formed of a body portion with a series of tabs formed along a bottom edge. The tabs are bent perpendicular to the body portion of the bracket in an alternating fashion. This forms a bracket having a T-shape providing a flat base for mounting a plastic shoe. Since the body portion is centered with respect to the alternating tabs a strong bracket for holding the plastic shoe is provided to guide or tension an associated strand of chain in a power transmission system.

Assembly of many plastic parts to other parts entail the use of a dart-type clip whereby a one-way tapered clip on the plastic part cantilevers into a locking position over a protrusion of the base part. The process of the cantilever spring portion of the clip bending to allow a taper to snap over the protrusion, places a tensile beam stress on the cantilevered spring. At times, the stress induced to the cantilevered spring necessary to clear the height of the protrusion can put high stresses on the cantilevered spring. Exposure to high stress can lead to reduced fatigue life of a part.

SUMMARY OF THE INVENTION

In a device having dart-type snap on clips without subjected to creeping, an apparatus and method are provided to improve upon the existing technology by eliminating or reducing the stress induced to the cantilever spring portion during the assembly process.

Accordingly, a device having an allowance for creeping is provided. The device includes: a base member having a receiving element; and an overlaying member, subject to creeping, overlaying on top of the base member, the overlaying member having a region at one end thereof, wherein a tip member is free from restriction or force exerted thereon due to creeping deformation thereof.

Accordingly, a method for reducing the deformation of a device due to creeping is provided. The method includes the steps of: providing a base member having a receiving element; providing an overlaying member, subject to creeping, overlaying on top of the base member, the overlaying member having a region at one end thereof; and allowing room for deformation due to creeping between the base member and the overlaying member within the region.

DESCRIPTION OF THE PREFERRED EMBODIMENT

This section includes the descriptions of the present invention including the preferred embodiment of the present invention for the understanding of the same. It is noted that the embodiments are merely describing the invention. The claims section of the present invention defines the boundaries of the property right conferred by law.

A part made from plastic or composite material will deform due to creep effect when loaded with a long-term static load or a cyclic repeating load. Creep is commonly known as the deformation on the part due to long term applied load or cyclic load. Creep behavior is especially pronounced while the part is subjected to elevated temperatures relative to the material properties of the part. Materials undergoing creep deformation will take a set relaxing in the direction of an applied load. The relaxation effect of the part caused by the creep effect eventually becomes a permanent deformation upon the part, and the part remains deformed in the direction of the applied load even after the load has been removed. The tendency of a material to deform due to creep is more pronounced with plastic polymer having no fillings (particularly including, but not limited to, glass fillings as the filler material).

The present invention takes advantage of the formally negative of the deformation of a part due to creep in a positive way. In other words, the formally negative tendency of a part to deform in creep is employed, in a positive way, to engage the clip locking mechanism on the part.

An additional improvement applies to a special case whereby the clip is designed to completely clear the protrusion of the mating part during the assembly process. As the part deforms due to creep under operation, the hook moves into place to engage the protrusion, resulting in a positive lock with the mating part. In this special case, the leading edge of the hooked clip does not need to be tapered thus saving space. In many design conditions, space is not readily available for tight packaging reasons.

The following figures show an example of applying the present invention.

Figure 1:
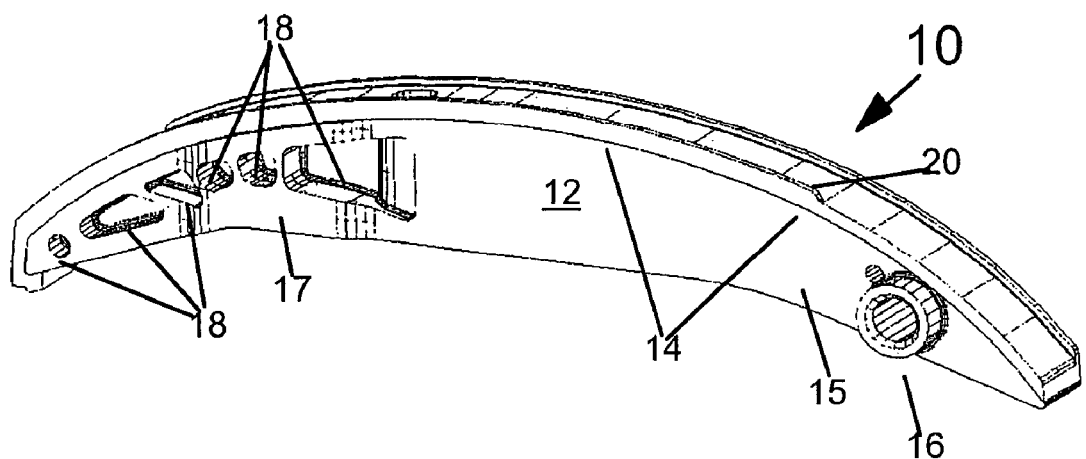
FIG. 1 shows an example of the present invention.

Referring to FIG. 1, a part 10 is shown. A structure element 12 forms the base of the 2-shot molded part 10. Structure element 12 has a generally elongated shape and includes a top wearing surface 14 along the longitudal length of the same. Structure element 12 may be made of glass-filled plastic or polymer structure. Alternatively, structure element 12 may be a metal bracket. A connecting member 16 having an annular opening for pivotal coupling to a stationary member (not shown) which is stationary in relation to a chain (also not shown) is provided at a first end 15 of structure element 12. A suitable connecting member (not shown) such as a bolt or dowel pin may be transposed through connecting member 16 for coupling to the stationary member. Along a second end 17 of structure element 12, recesses 18 are formed on both sides of the structure element 12 (only one side shown).

A wearing element 20 formed of a material having more elasticity or less rigidity as compared with structure element 12 is provided. Wearing element 20 is also known as a face or a shoe: Wearing element 20 is generally made of polymer material such as plastic without filler reinforcement. Wearing element 20 has a shape that traces or follows the generally elongated shape of structure element 12. Wearing element 20 further includes a first surface 22 and a second surface 24. First surface 22 is disposed to be in contact with a chain (not shown) thereby keeping the chain at a suitable tension or guide the chain in a predetermined matter. Second surface 24 is disposed to be in physical contact with top surface 14 of structure element 12. It is pointed out that there is no chemical bonding between wearing element 20 and structure element 12 even if both elements (12, 20) are made of polymer materials. Wearing element 20 is divided into a first end 25 and a second end 27. First end 25 structurally corresponds to the first end 15 of structure element 12. Second end 27 structurally corresponds to the second end 17 of structure element 12.

A set of connecting elements 26 is formed on both the first end 15 and the second end 17 of wearing element 20. Elements 26 may be clips which are formed along with wearing element 20. It is noted that top surface 14 possesses a suitable receiving elements for connecting elements 26 to element 12 thereby physically engaging or connecting wearing element 20 and structure element 12 together. Wearing element 20 further has a dart-type snap 30 for engaging or connecting structure element 12 thereto.

Figure 1A:
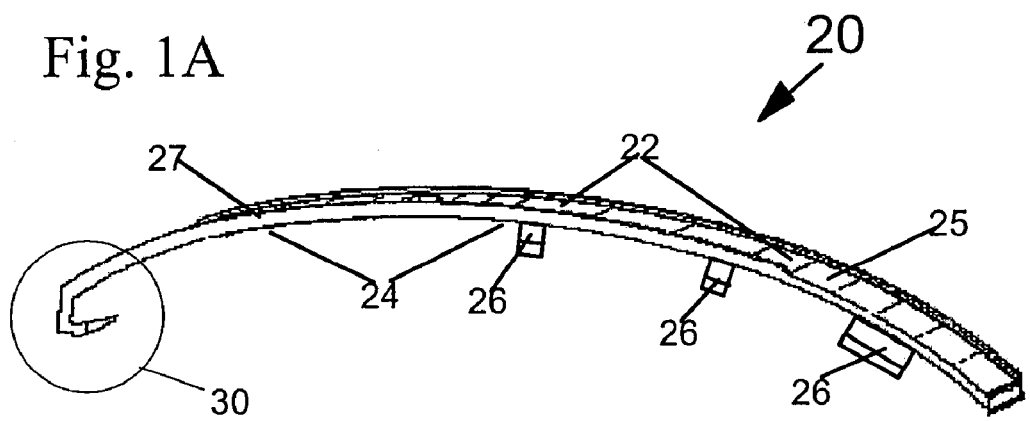
FIG. 1A shows a perspective view of the top portion or wearing element of FIG. 1.

It is noted that FIGS. 1 and 1A are merely an example of the present invention. Other type of devices having dart-type snap on clips is contemplated by the present invention as well. Furthermore, structure element 12 may have different elements formed in location other than dart-type snap 30 area. Also, structure element 12 may be part of the tensioner arm or part of a chain guide.

Figure 2:
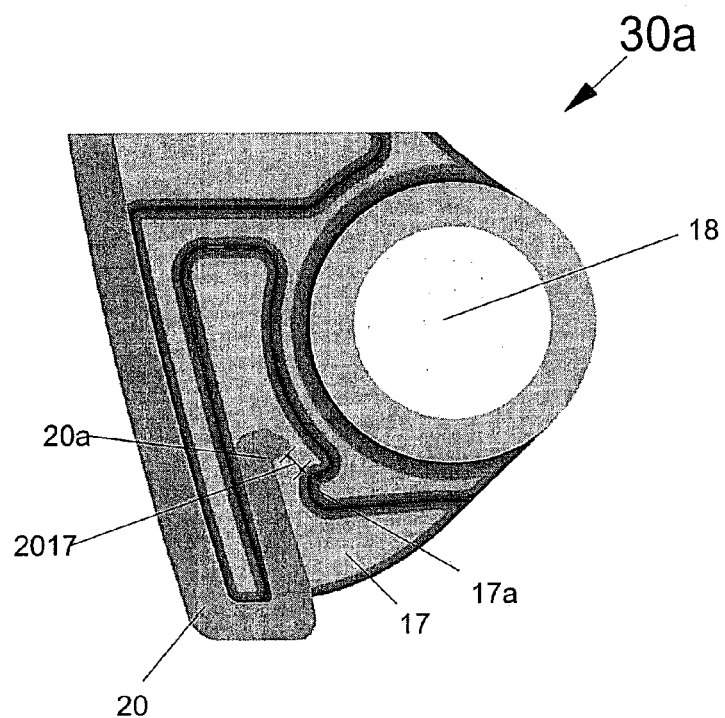
FIG. 2 shows a device having dart-type snap on clips without creeping.
Figure 2A:
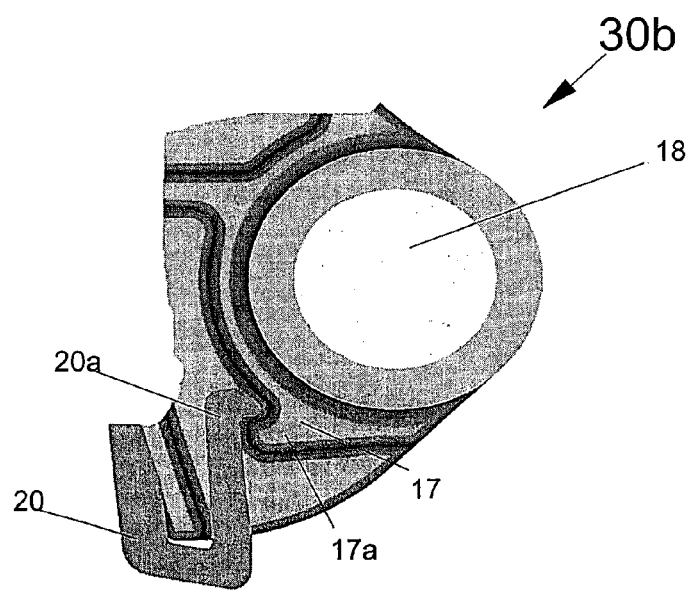
FIG. 2A shows a device having dart-type snap on clips with creeping.

FIGS. 2 and 2A show more detailed depiction of the dart-type snap 30 as applied to the present invention.

Referring to FIG. 2, a first view 30a wherein a device having dart-type snap on clips without creeping is shown. A one to one correspondence of elements with FIGS. 1 and 1A can be shown. However, FIG. 2 is generally applicable to devices having dart-type snap on clips. Second end 17 of structure element 12 possesses a retaining element 17a which is formed through an integral extension of second end 17. In other words, retaining element 17a is a suitable protrusion from second end 17. Retaining element 17a is formed to stop the movement of another member the details of the stopping is disclosed in FIG. 2A infra. An elongated member 20, such as the face or shoe of a tensioner arm or chain guide, overlaying end 17 of the structure element 12 is provided. At a tip or end of the elongated member 20, a tip element 20a is formed in which element 20a is an integral part or an integral extension of elongated member 20. Tip element 20a is suitably formed to be in contact with retaining element 17a is a desirous way. In addition, tip element 20a may not span the whole width of top surface 22 of the elongated member 20. For example, second end 27 of the elongated member may branch into two sections at its tip in area 30. The two sections may include a first section with tip element 20a, a second section without the tip element 20a. Opening 18 is provided for a suitable structural formation of the structure element 12.

Referring to FIG. 2A, a second view 30b wherein a devices having dart-type snap on clips with creeping is shown. As can be appreciated, due to the creeping effect the elongated member 20 which is typically made of polymer materials together with some kind of filler material tends to deform. The creep may be caused by wear of a chain onto surface 22, the ambient temperature around the device, or a combination of the former. The elongated member 20 is typically made of polymer materials together with some kind of filler material.

As can be appreciated, the present invention improves upon the existing technology for dart-type snap on clips by eliminating or reducing the stress induced to the cantilever spring portion such as region 30 of the clip during the assembly process. Reducing the stress induced during assembly will help improve durability of the part by subjecting the clip free from an initial high stress cycle during the assembly process. The hooked portion or tip 20a of the clip is designed to either clear the protrusion of the mating part such as by leaving a desire gap 2017, or to reduce the maximum stress induced to the clip.

The present invention provides an apparatus, such as the shoe or face on a tensioner arm, having no force impeding its deformation due to creeping. By way of examples, gap 2017 is provided such that when member 20 deforms due to creeping, no force or other members will stand in its way because of the existence of gap 2017.

As can be appreciated, the present invention functions much like the way a fishhook works.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A device having allowance for creeping, comprising:
   a base having a mating portion; and
   a face located on top of the base, wherein the face is subject to creep, the face comprising a clip, which mates with the mating portion of the base, that is free of force exerted on the face due to creeping deformation;
   wherein the clip is selectively engageable with the mating portion of the base.

2. The device of claim 1, wherein the face is made of plastic.

3. The device of claim 1, wherein the mating portion is not engaged with the clip prior to deformation of the device due to creep and the clip creeps into engagement with the mating portion.

4. The device of claim 1, wherein the base is the base of a tensioning arm or a chain guide.

5. The device of claim 1, wherein the face is a face or a shoe of a tensioning arm or a chain guide.

6. The device of claim 1, wherein the base further comprises at least one receiving element and the face further comprises at least one connecting element, wherein the connecting element is received by the receiving element.

7. The device of claim 1, wherein the face is made of plastic and a filler material.

8. The device of claim 1, wherein the mating portion is located on a first end of the base and the clip is located on an end of the face corresponding to the first end of the base.

9. The device of claim 1, wherein the clip is a dart-type clip.

10. A method of reducing stress during assembly of a device comprising a base having a mating portion and a face located on top of the base, wherein the face is subject to creep, the face comprising a clip-locking mechanism shaped to engage the mating portion of the base, the method comprising the steps of:
 a) assembling the face and the base such that the clip-locking mechanism is not engaged with the mating portion and is selectively engageable with the mating portion; and
 b) engaging the clip locking mechanism with the mating portion, when the device is deformed due to creep.

11. The method of claim 10, wherein the mating portion is located on a first end of the base and the clip-locking mechanism is located on an end of the face corresponding to the first end of the base.

12. The method of claim 10, wherein the clip-locking mechanism is a dart-type clip.

13. The method of claim 10, wherein the base is the base of a tensioning arm or a chain guide and the face is a face or a shoe of the tensioning arm or the chain guide.

* * * * *